(12) United States Patent
Zhang et al.

(10) Patent No.: US 12,395,262 B2
(45) Date of Patent: Aug. 19, 2025

(54) METHOD AND APPARATUS FOR SERVICE PROCESSING IN OPTICAL TRANSPORT NETWORK, AND ELECTRONIC DEVICE

(71) Applicant: ZTE CORPORATION, Guangdong (CN)

(72) Inventors: Yuanbin Zhang, Guangdong (CN); Yan Yuan, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 432 days.

(21) Appl. No.: 17/914,790

(22) PCT Filed: Dec. 28, 2020

(86) PCT No.: PCT/CN2020/140282
§ 371 (c)(1),
(2) Date: Sep. 27, 2022

(87) PCT Pub. No.: WO2021/190030
PCT Pub. Date: Sep. 30, 2021

(65) Prior Publication Data
US 2023/0135776 A1    May 4, 2023

(30) Foreign Application Priority Data
Mar. 27, 2020    (CN) .......................... 202010232125.2

(51) Int. Cl.
*H04Q 11/00* (2006.01)
*H04J 3/16* (2006.01)
*H04J 14/00* (2006.01)

(52) U.S. Cl.
CPC ........ *H04J 3/1652* (2013.01); *H04Q 11/0067* (2013.01); *H04J 14/00* (2013.01);
(Continued)

(58) Field of Classification Search
CPC .... H04J 3/1652; H04J 3/07; H04J 2203/0073; H04J 14/00; H04Q 11/0067;
(Continued)

(56) References Cited

U.S. PATENT DOCUMENTS 8,989,222 B1 * 3/2015 Mok ................... H04J 14/0201
                                                        370/476
9,231,721 B1 * 1/2016 Varadarajan .......... H04J 3/1664
(Continued)

FOREIGN PATENT DOCUMENTS

| CN | 1773898 A | 5/2006 |
|---|---|---|
| CN | 101651512 A | 2/2010 |

(Continued)

OTHER PUBLICATIONS

WIPO, International Search Report issued on Feb. 26, 2021.
(Continued)

*Primary Examiner* — Dibson J Sanchez
(74) *Attorney, Agent, or Firm* — Li & Cai Intellectual Property (USA) Office

(57) ABSTRACT

Embodiments of the present disclosure provides a method for service processing in an optical transport network including: mapping a client service into a service container; and mapping the service container into an optical transport network frame, where a payload area of the optical transport network frame consists of payload blocks, each of the payload blocks includes an overhead area, and the overhead area includes an indicator being used for indicating whether data carried by the payload block is service container data or stuff data. The embodiments of the present disclosure further provide an apparatus for service processing in an optical transport network, an electronic device and a computer readable medium.

13 Claims, 6 Drawing Sheets payload block carrying stuff data payload block carrying service container data (52) U.S. Cl.
CPC .......... *H04Q 11/00* (2013.01); *H04Q 11/0062* (2013.01); *H04Q 2011/0086* (2013.01)

(58) Field of Classification Search
CPC ........... H04Q 2011/0086; H04Q 11/00; H04Q 11/0062; H04L 49/9084
USPC .................................................. 398/43–103
See application file for complete search history.

(56) References Cited

U.S. PATENT DOCUMENTS

| | | | |
|---|---|---|---|
| 2006/0104309 A1 | 5/2006 | Vissers et al. | |
| 2008/0075113 A1* | 3/2008 | Harley ................... | H04B 10/27 370/466 |
| 2010/0226648 A1* | 9/2010 | Katagiri .................. | H04J 3/076 398/140 |
| 2010/0226652 A1* | 9/2010 | Vissers .................. | H04B 10/27 398/98 |
| 2011/0135304 A1* | 6/2011 | Katagiri ................ | H04J 3/1629 398/45 |
| 2016/0142799 A1* | 5/2016 | Makishima ........... | H04J 3/1652 398/52 |
| 2016/0261934 A1* | 9/2016 | Yoshida ................ | H04J 3/0691 |
| 2017/0230736 A1* | 8/2017 | Su ....................... | H04Q 11/0062 |
| 2018/0098076 A1 | 4/2018 | Su et al. | |
| 2020/0092029 A1 | 3/2020 | Vissers et al. | |
| 2020/0374023 A1 | 11/2020 | Su et al. | |
| 2021/0083774 A1* | 3/2021 | Su ........................ | H04L 1/0046 |
| 2021/0084383 A1* | 3/2021 | Xiang .............. | H04N 21/64792 |
| 2022/0052762 A1* | 2/2022 | Su ......................... | H04J 3/1658 |
| 2022/0337925 A1* | 10/2022 | Su ...................... | H04Q 11/0067 |

FOREIGN PATENT DOCUMENTS

| | | |
|---|---|---|
| CN | 101800912 A | 8/2010 |
| CN | 105429726 A | 3/2016 |
| CN | 106301678 A | 1/2017 |
| CN | 110557217 A | 12/2019 |
| JP | 2018517371 A | 6/2018 |
| KR | 20110095893 A | 8/2011 |
| WO | WO 2018001248 A1 | 1/2018 |
| WO | WO 2020034954 A1 | 2/2020 |

OTHER PUBLICATIONS

Korean Patent Office, first Office action dated Feb. 20, 2024, for corresponding KR application No. 10-2022-7030303.
G.Sup_sub1G "Sub 1 Gbit/s services transport over OTN"—Text proposal for defining legacy PDH/SDH signal mapping into sub1G OTN, International Telecommunication Union, Nov. 1, 2019.
China Patent Office, First Office Action (OA1) dated May 28, 2025, for corresponding CN application No. 202010232125.2.

* cited by examiner

METHOD AND APPARATUS FOR SERVICE PROCESSING IN OPTICAL TRANSPORT NETWORK, AND ELECTRONIC DEVICE

CROSS-REFERENCE TO RELATED APPLICATIONS

The present disclosure is a National Phase Application filed under 35 U.S.C. 371 as a national stage of PCT/CN2020/140282, filed on Dec. 28, 2020, an application claiming the priority to Chinese Patent Application No. CN202010232125.2 filed on Mar. 27, 2020, the entire contents of which are incorporated herein by reference.

TECHNICAL FIELD

Embodiments of the present disclosure relates to the field of optical communication technology, and in particular, to a method and an apparatus for service processing in optical transport network, an electronic device, and a computer readable medium.

BACKGROUND

In Optical Transport Network (OTN), many mapping methods from service container to OTN payload are defined, including: Bit-synchronous Mapping Procedure (BMP), Asynchronous Mapping Procedure (AMP), Generic Mapping Procedure (GMP), etc. Among them, GMP has no mandatory requirements for service container rate and service layer frame rate, and is the most widely used mapping scheme.

During the GMP mapping process, a service layer frame consists of several Payload Blocks (PBs) with fixed length. When mapping the service container into the service layer frame, the number N of the PBs contained in the service layer frame bearing the service container and the number C of the PBs occupied by the service container will be determined according to the service container rate, and then distribution locations of the C PBs occupied by the service container in the N fixed-length blocks of the service layer frame are calculated according to the sigma-delta algorithm.

When performing the GMP mapping, the location where the service container data is stored in the service layer frame is a fixed location calculated according to the sigma-delta algorithm. In order to ensure that the location for storing the service container data calculated in the service layer frame can be filled normally with the service container data, a larger cache needs to be allocated for each client service, and a larger cache means a larger delay.

SUMMARY

Embodiments of the present disclosure provide a method and an apparatus for service processing in optical transport network, an electronic device, and a computer readable medium.

In a first aspect, an embodiment of the present disclosure provides a method for service processing in optical transport network, including: mapping a client service into a service container; and mapping the service container into an optical transport network frame, wherein a payload area of the optical transport network frame consists of payload blocks, each of the payload blocks includes an overhead area, and the overhead area includes an indicator being used for indicating whether data carried by the payload block is service container data or stuff data.

In some embodiments, in the payload area of the optical transport network frame, multiple consecutive payload blocks are used as a transmission period, and mapping the service container into the optical transport network frame includes: calculating the number N1 of payload blocks that need to be occupied by the service container in one transmission period according to a bandwidth of the service container and a bandwidth of the payload blocks; determining distribution locations in the transmission period of payload blocks that need to be occupied by the service container based on a preset allocation algorithm according to the number N1 of payload blocks that need to be occupied by the service container in the transmission period; and mapping the service container into the payload blocks at the determined distribution locations.

In some embodiments, the bandwidth of the payload blocks allocated to the service container is larger than the bandwidth of the service container, and when mapping the service container into the payload blocks, the stuff data is inserted for rate adaptation, and the indicator is used to indicate whether the payload block carries the service container data or the stuff data.

In some embodiments, in one transmission period, for the payload blocks for bearing the service container, in a case that data size of the service container data buffered in a service container cache area exceeds a size of one payload block, the service container data is carried in the payload blocks; otherwise, the stuff data is carried in the payload block.

In some embodiments, in M transmission periods, N1*M payload blocks for bearing the service container form a service layer frame, and the number of the payload blocks for carrying the service container data in the service layer frame is C;

$$C = \text{floor}\left(\frac{v*M*t}{L}\right)$$

wherein M is a preset integer, floor( ) is a round-down function, v represents a service container bit rate, t represents a time duration for sending data of one transmission period, and L represents a length of one payload block.

In some embodiments, mapping the service container into the payload blocks at the determined distribution locations includes: determining types of data expected to be carried respectively by N payload blocks of the service layer frame based on a preset allocation algorithm according to the number C of the payload blocks that need to be occupied by the service container data in M transmission period, wherein N=N1*M, and the types of data include the service container data or the stuff data; and determining types of data actually carried by the N payload blocks of the service layer frame according to data size of the service container data buffered in the service container cache area and the types of data expected to be carried respectively by the N payload blocks of the service layer frame.

In some embodiments, the preset allocation algorithm includes sigma-delta algorithm.

In some embodiments, determining the types of data actually carried by the N payload blocks of the service layer frame according to the data size of the service container data buffered in the service container cache area and the types of data expected to be carried respectively by the N payload blocks of the service layer frame includes: for each of the N payload blocks of the service layer frame, in a case that the payload block is expected to carry the service container data, deciding whether the data size of the service container data buffered in the service container cache area exceeds a size of one payload block; and in a case that the data size of the service container data buffered in the service container cache area exceeding the size of one payload block is decided, determining that the payload block actually carries the service container data; otherwise, determining that the payload block actually carries the stuff data.

In some embodiments, determining the types of data actually carried by the N payload blocks of the service layer frame according to the data size of the service container data buffered in the service container cache area and the types of data expected to be carried respectively by the N payload blocks of the service layer frame further includes: for each of the N payload blocks of the service layer frame, in a case that the payload block is expected to carry the stuff data, deciding whether the data size of the service container data buffered in the service container cache area exceeds a preset threshold; and in a case that the data size of the service container data buffered in the service container cache area exceeding the preset threshold is decided, determining that the payload block actually carries the service container data; otherwise, determining that the payload block actually carries the stuff data, wherein the preset threshold is greater than or equal to a size of one payload block.

In some embodiments, the indicator occupies 1 bit, the indicator of the payload block carrying the service container data is 1, and the indicator of the payload block carrying the stuff data is 0.

In some embodiments, the method further includes: acquiring the optical transport network frame, and acquiring data flow from the payload area of the optical transport network frame; determining payload blocks carrying the service container data according to the indicators within the payload blocks in the data flow, and extracting the service container data; and acquiring the client service from the service container.

In a second aspect, an embodiment of the present disclosure further provides an apparatus for service processing in optical transport network, including: a first mapping module configured to map a client service into a service container; and a second mapping module configured to map the service container into an optical transport network frame, wherein a payload area of the optical transport network frame includes multiple payload blocks, each of the payload blocks includes an overhead area, and the overhead area includes an indicator being used for indicating whether data carried by the payload block is service container data or stuff data.

In some embodiments, the apparatus further includes: a first acquisition module configured to acquire the optical transport network frame, and acquire data flow from the payload area of the optical transport network frame; an extraction module configured to determine payload blocks carrying the service container data according to the indicators within the payload blocks in the data flow, and extract the service container data; and a second acquisition module configured to acquire the client service from the service container.

In a third aspect, an embodiment of the present disclosure further provides an electronic device, including: one or more processors; and a memory storing one or more programs thereon, wherein the one or more programs, when executed by the one or more processors, cause the one or more processors to implement the method provided by the first aspect.

In a fourth aspect, an embodiment of the present disclosure further provides a computer readable medium storing a computer program thereon, wherein the computer program, when executed by a processor, cause the processor to implement the method provided by the first aspect.

DETAIL DESCRIPTION OF EMBODIMENTS

In order for those skilled in the art to better understand the technical solutions of the present disclosure, a method and an apparatus for service processing in optical transport network, an electronic device, and a computer readable medium provided by the embodiments of the present disclosure will be described in detail below in combination with the accompanying drawings.

Exemplary embodiments will be described more fully hereinafter with reference to the accompanying drawings although they may be embodied in different forms and should not be construed as limited to the embodiments set forth herein. Rather, these embodiments are provided so that this disclosure will be thorough and complete, and will fully convey the scope of the disclosure to those skilled in the art.

Various embodiments of the present disclosure and various features in the embodiments may be combined with each other as long as there is no conflict.

As used herein, the term "and/or" includes any and all combinations of one or more of the associated listed items.

The terms used herein are used to describe particular embodiments only and are not intended to limit the present disclosure. As used herein, the singular forms "a" and "the" are intended to include the plural forms as well, unless the context clearly dictates otherwise. It will also be understood that when the terms "comprising" and/or "made of" are used in this specification, the stated features, integers, steps, operations, elements and/or components are specified to be present, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art. It will also be understood that terms such as those defined in commonly used dictionaries should be construed as having meanings consistent with their meanings in the context of the related art and this disclosure, and will not be construed as having idealized or over-formal meanings, unless explicitly so limited herein.

Figure 1:
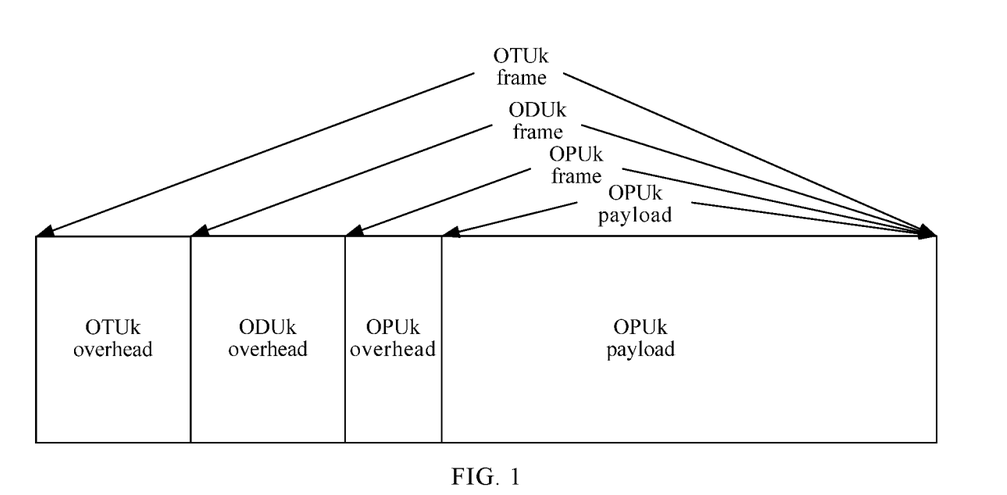
FIG. 1 is a schematic diagram of an optical channel frame structure involved in the present disclosure.

FIG. 1 is a schematic diagram of an optical channel frame structure involved in the present disclosure. As shown in FIG. 1, in the present disclosure, description is made by taking an example that signal in the optical transport network is an Optical channel Transport Unit (OTU) signal. The OTU signal consists of OTUk frames, including an overhead area and a payload area. The overhead area includes: overhead of Optical channel Transport Unit (referred to as "OTUk overhead", k can take values 1, 2, 3, 4), overhead of Optical channel Data Unit (ODU) (referred to as "ODUk overhead", k can take values 0, 1, 2, 2e, 3, 4), and overhead of Optical channel Payload Unit (OPU) (referred to as "OPUk overhead", k can take values 0, 1, 2, 2e, 3, 4). The remainder of the OTUk frame except the OTUk overhead is referred to as the ODUk frame, the remainder of the ODUk frame except the ODUk overhead is referred to as the OPUk frame, and the remainder of the OPUk frame except the OPUk overhead is referred to as the OPUk payload (that is, the payload area of the optical channel frame structure), and the payload area can be used to bear service signals.

Figure 2:
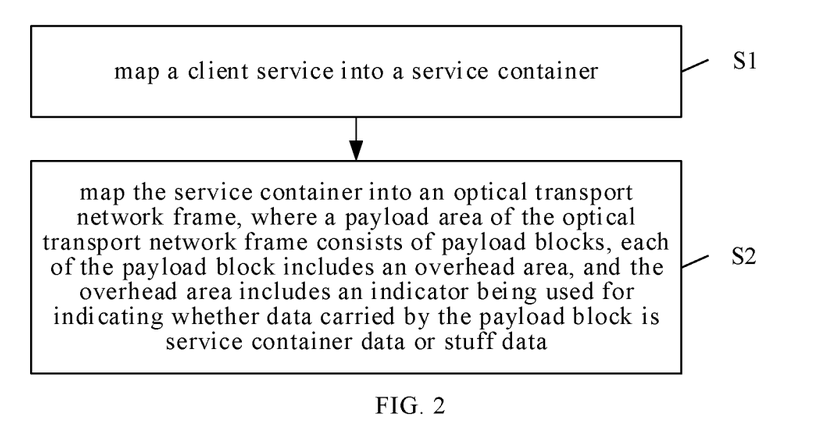
FIG. 2 is a flowchart of a method for service processing in optical transport network according to the present disclosure.

FIG. 2 is a flowchart of a method for service processing in optical transport network according to the present disclosure. As shown in FIG. 2, the method for service processing in optical transport network includes Operations S1 to S2.

At Operation S1, a client service is mapped into a service container.

In the present disclosure, the client service specifically refers to a service that is a small-granularity service for the optical transport network frame (generally also referred to as a Sub1G service). Specifically, a ratio of the bandwidth of the client service to the bandwidth of the payload area of the optical transport network frame is less than a preset ratio, and the specific value of the preset ratio is set by professionals in the industry. Generally, the value of the preset ratio is less than or equal to 10%. In the present disclosure, it is only necessary to ensure that the bandwidth of the client service is smaller than the bandwidth of the payload area of the optical transport network frame. In the present disclosure, the service container includes an ODU frame or an Optical Service Unit (OSU) frame. The process of mapping the client service into the service container belongs to the conventional technology in the art, and will not be repeated here.

At Operation S2, the service container is mapped into an optical transport network frame, wherein a payload area of the optical transport network frame consists of payload blocks, each of the payload block includes an overhead area, and the overhead area includes an indicator being used for indicating whether data carried by the payload block is service container data or stuff data.

The payload block refers to a certain number (greater than 1) of consecutive bits occupied in the payload area, and the payload block is used to bear the client service.

In the present disclosure, an overhead area is provided in the payload block, the overhead area has an indicator, and the indicator can indicate whether the data carried by the payload block is the service container data or the stuff data. Due to the indicator, in the process of mapping the service container into the optical transport network frame, rate adaptation can be performed by inserting the stuff data. Locations of the payload blocks for carrying the service container data in the payload area can be dynamically changed according to the service container rate. Therefore, the size of the service container cache area required to be set can be decreased accordingly, which is beneficial to reduce the delay of the service mapping process.

In the present disclosure, the indicator occupies 1 bit, the indicator of the payload block carrying the service container data is 1, and the indicator of the payload block carrying the stuff data is 0.

In the present disclosure, the indicator occupies multiple bits (e.g., 1 byte), the indicator in the data block carrying the service container data is a Tributary Port Number (TPN), and the indicator in the data block carrying the stuff data is all zeros or all ones.

The technical solution of the present disclosure does not limit the specific representation for indicating the service container data and the stuff data by using the indicator.

Figure 3:
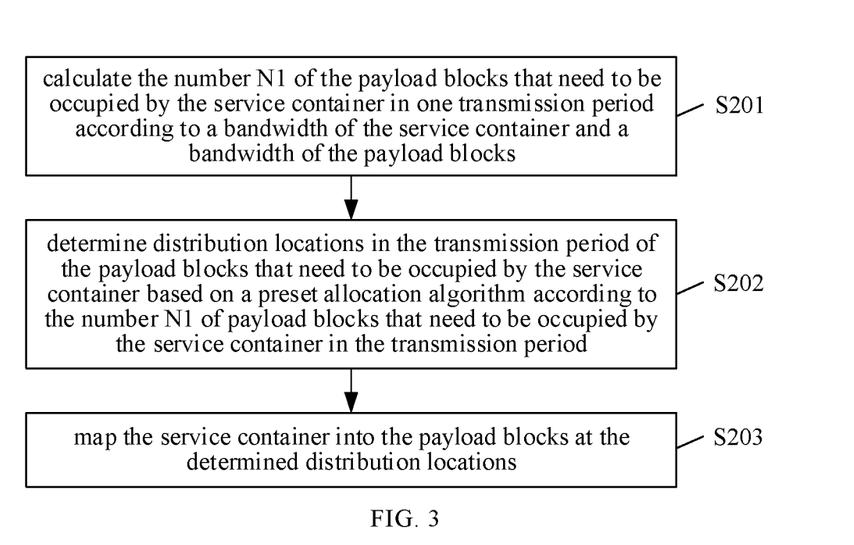
FIG. 3 is a flowchart of a specific implementation of Operation S2 in the present disclosure.

FIG. 3 is a flowchart of a specific implementation of Operation S2 in the present disclosure. As shown in FIG. 3, in the present disclosure, in the payload area of the optical transport network frame, multiple consecutive payload blocks are used as a transmission period, and in this case Operation S2 includes Operations S201 to S203. At Operation S201, the number N1 of payload blocks that need to be occupied by the service container in one transmission period is calculated according to a bandwidth of the service container and a bandwidth of the payload blocks At Operation S202, distribution locations in the transmission period of payload blocks that need to be occupied by the service container is determined based on a preset allocation algorithm according to the number N1 of payload blocks that need to be occupied by the service container in the transmission period.

In the present disclosure, the preset allocation algorithm includes sigma-delta algorithm.

At Operation S203, the service container is mapped into the payload blocks at the determined distribution locations.

The bandwidth of the payload blocks allocated to the service container is larger than the bandwidth of the service container. When mapping the service container into the payload blocks, the stuff data is inserted for rate adaptation, and the indicator is used to indicate whether the payload block carries the service container data or the stuff data.

In the present disclosure, in one transmission period, for the payload blocks for bearing the service container, in a case that data size of the service container data buffered in a service container cache area exceeds a size of one payload block, the service container data is carried in the payload blocks; otherwise, the stuff data is carried in the payload block.

In the present disclosure, in M transmission periods, N1*M payload blocks for bearing the service container form a service layer frame, and the number of the payload blocks for carrying the service container data in the service layer frame is C;

$$C = \text{floor}\left(\frac{v*M*t}{L}\right)$$

M is a preset integer, floor( ) is a round-down function, v represents a service container bit rate, t represents a time duration for sending data of one transmission period, and L represents a length of one payload block.

Figure 4:
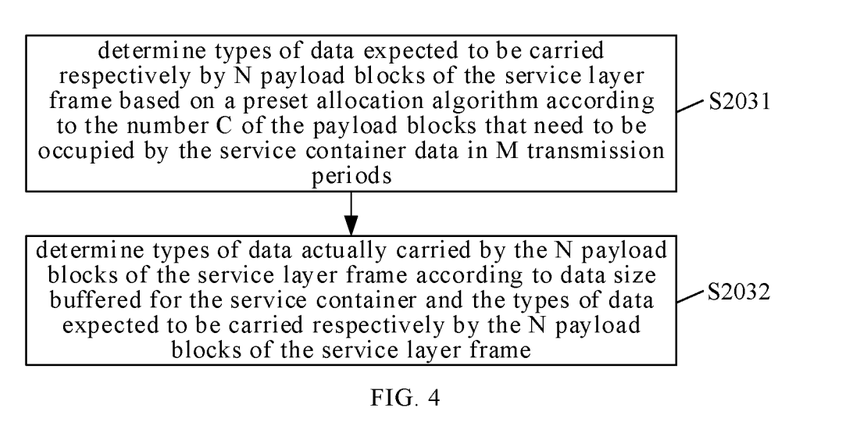
FIG. 4 is a flowchart of a specific implementation of Operation S203 in the present disclosure.

FIG. 4 is a flowchart of a specific implementation of Operation S203 in the present disclosure. As shown in FIG. 4, in the present disclosure, Operation S203 includes Operation S2031 to S2032.

At Operation S2031, types of data expected to be carried respectively by N payload blocks of the service layer frame are determined based on a preset allocation algorithm according to the number C of the payload blocks that need to be occupied by the service container data in M transmission period.

In the present disclosure, the data type includes service container data or stuff data. The service container data refers to data related to the client service, and the stuff data is data preset for data filling (generally set as all zeros).

In M transmission periods, the number of the payload blocks that need to be occupied by the service container is N1*M, that is, the number of the payload blocks contained in the service layer frame corresponding to the service container is N=N1*M.

The preset allocation algorithm in Operation S2031 can be used to determine the distribution locations of the C payload blocks for carrying the service container data in the service layer frame, the type of data expected to be carried by the payload blocks at these determined locations is service container data, and the type of data expected to be carried by the payload blocks at other locations is stuff data.

In the present disclosure, the preset allocation algorithms used in Operations S202 and S2031 are both sigma-delta algorithms, the specific operation process of the sigma-delta algorithm is a conventional technology in the art, which will not be repeated here.

Operation S2032, types of data actually carried by the N payload blocks of the service layer frame are determined according to data size of the service container data buffered in the service container cache area and the types of data expected to be carried respectively by the N payload blocks of the service layer frame.

In the present disclosure, the types of data expected to be carried respectively by the N payload blocks in the service layer frame may be determined first based on the number C of the payload blocks that need to be occupied by the service container data and the number N of the payload blocks contained in the service layer frame of the service container, that is, it is preliminarily determined which data blocks (the quantity is C) in the N payload blocks are used to carry the service container data, and which data blocks (the quantity is N−C) are used to carry the stuff data. Then, the final type of data carried by each of the N payload blocks is determined according to the types of data expected to be carried respectively by the N payload blocks and the data size of the service container data buffered in the service container cache area.

Figure 5:
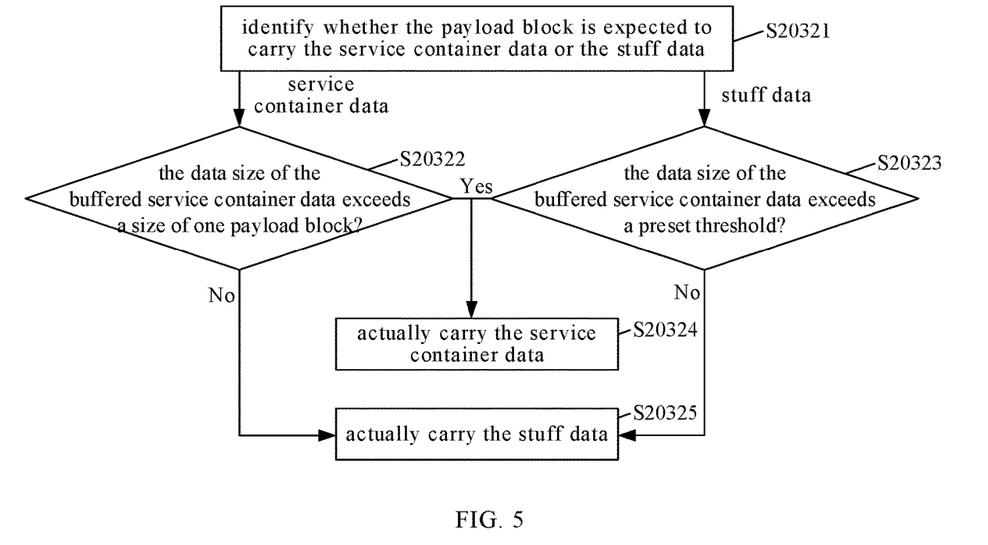
FIG. 5 is a flowchart of a specific implementation of Operation S2032 in the present disclosure.

FIG. 5 is a flowchart of a specific implementation of Operation S2032 in the present disclosure. As shown in FIG. 5, the payload blocks are continuously arriving, and when any one of the N payload blocks of the service layer frame arrives, the following Operations S20321 to S20325 are performed.

At Operation S20321, it is identified whether the payload block is expected to carry the service container data or the stuff data.

If it is identified that the payload block is expected to carry the service container data, Operation S20322 is performed; if it is identified that the payload block is expected to carry the stuff data, Operation S20323 is performed.

At Operation S20322, it is decided whether the data size of the service container data buffered in the service container cache area exceeds a size of one payload block.

In Operation S20322, if it is decided that the data size of the service container data buffered in the service container cache area exceeds the size of one payload block, Operation S20324 is performed; otherwise, Operation S20325 is performed.

At Operation S20323, it is decided whether the data size of the service container data buffered in the service container cache area exceeds a preset threshold.

The preset threshold is greater than or equal to the size of one payload block.

In Operation S20323, if it is decided that the data size of the service container data buffered in the service container cache area exceeds the preset threshold, Operation S20324 is performed; otherwise, Operation S20325 is performed.

At Operation S20324, it is determined that the payload block actually carries the service container data, and the service container data in the cache is carried into the payload block.

At Operation S20325, it is determined that the payload block actually carries the filling, and the stuff data is carried into the payload block.

In the method for service processing in optical transport network provided by the present disclosure, an indicator is set in the payload block to indicate whether the data carried by the payload block is service container data or stuff data, so that in the process of mapping the service container into the optical transport network frame, rate adaptation can be performed by inserting the stuff data. Locations of the payload blocks for carrying the service container data in the payload area can be dynamically changed according to the service container rate. Therefore, the size of the service container cache area required to be set can be decreased accordingly, which is beneficial to reduce the delay of the service mapping process.

Figure 6:
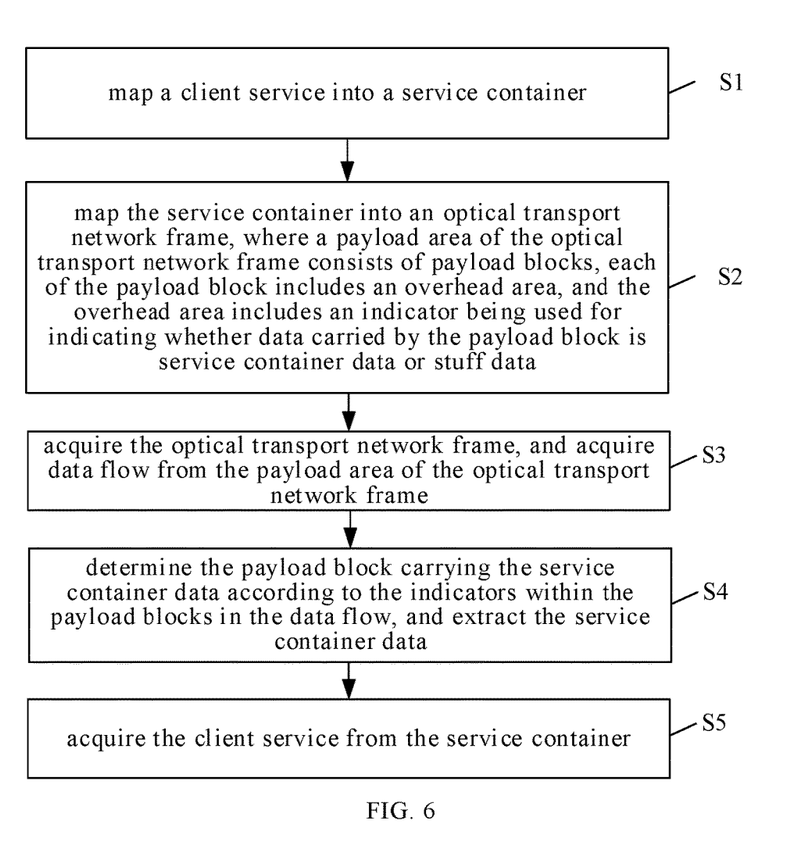
FIG. 6 is another flowchart of a method for service processing in optical transport network according to the present disclosure.

FIG. 6 is another flowchart of a method for service processing in optical transport network according to the present disclosure. As shown in FIG. 6, the method for service processing in optical transport network includes not only forgoing Operations S1 and S2, but also Operations S3 to S5, and hereinafter only Operations S3 to S5 are described in detail.

At Operation S3, the optical transport network frame is acquired, and data flow is acquired from the payload area of the optical transport network frame.

At Operation S4, the payload blocks carrying the service container data are determined according to the indicators within the payload blocks in the data flow, and the service container data is extracted.

At Operation S5, the client service is acquired from the service container.

First, by identifying the indicator in each payload block, it can be determined whether the data carried by the payload block is service container data or stuff data; then, the corresponding service container data is extracted from the payload block carrying the service container data to obtain the service container; finally, the client service is acquired from the obtained service container.

It should be noted that Operations S1 and S2 are applied to the data sending side, and Operations S3 to S5 are applied to the data receiving side. In practical applications, an optical transport network device can be used as both a data sending side and a data receiving side.

Hereinafter, detailed description will be given with reference to specific examples.

Figure 7:
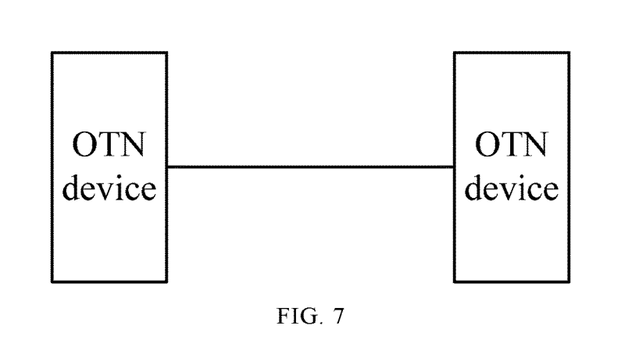
FIG. 7 is a schematic diagram of a transmission scenario corresponding to an example of the present disclosure.
Figure 8:
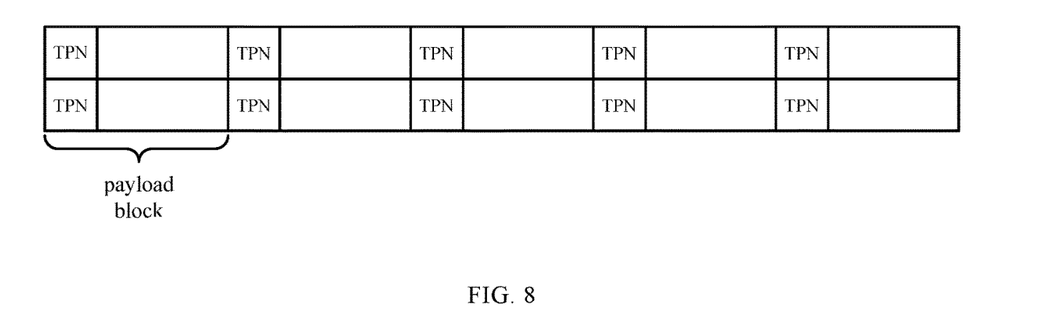
FIG. 8 is a schematic diagram of a service layer frame containing 10 payload blocks in the present disclosure.
Figure 9:
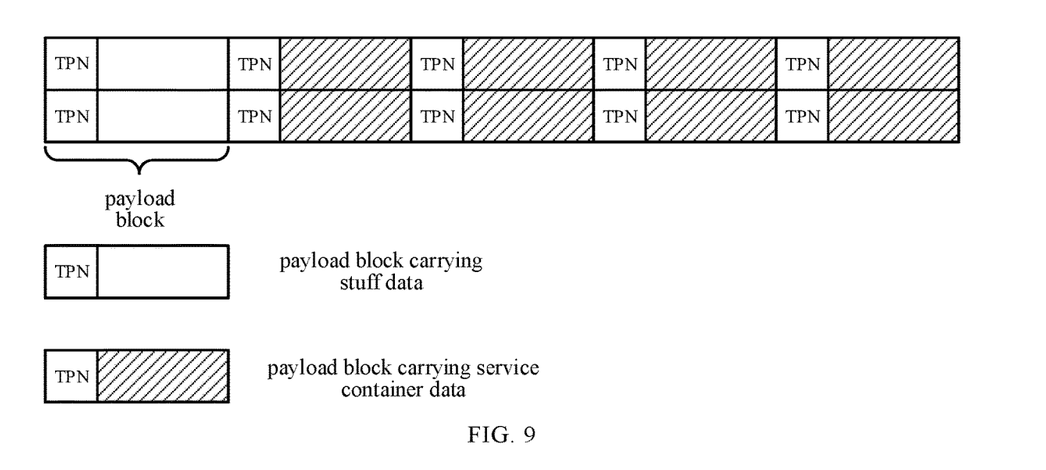
FIG. 9 is a schematic diagram of types of data expected to be carried by the payload blocks in the service layer frame shown in FIG. 8.
Figure 10:
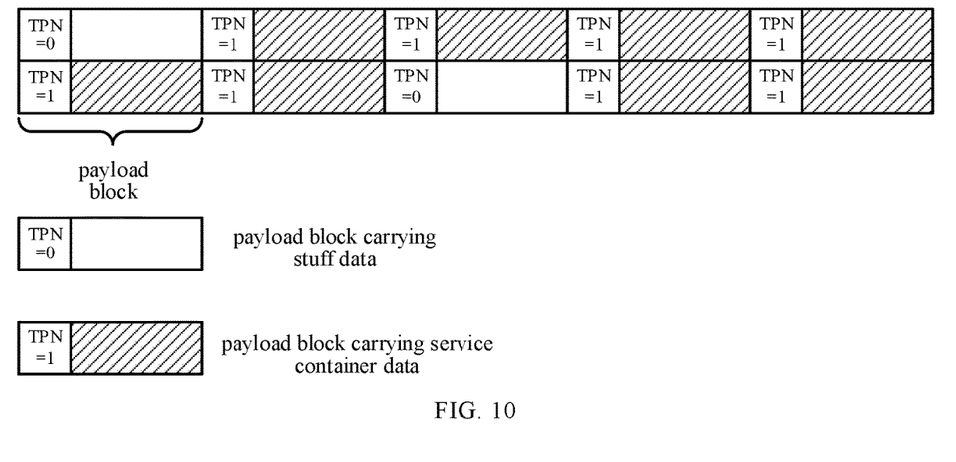
FIG. 10 is a schematic diagram of types of data actually carried by the payload blocks in the service layer frame shown in FIG. 9.

FIG. 7 is a schematic diagram of a transmission scenario corresponding to an example of the present disclosure. FIG. 8 is a schematic diagram of a service layer frame containing 10 payload blocks in the present disclosure. FIG. 9 is a schematic diagram of types of data expected to be carried by the payload blocks in the service layer frame shown in FIG. 8. FIG. 10 is a schematic diagram of types of data actually carried by the payload blocks in the service layer frame shown in FIG. 9. As shown in FIGS. 7 to 10, one client service is transmitted between two OTN devices through an OTN interface, and an OTN frame is divided according to the payload block. The service layer frame of the service container bearing the client service is a part of the payload area of the OTN frame. It is assumed that the service layer frame bearing the OSU service container contains 10 data blocks, and according to the service container rate, it is calculated that the OSU service container needs to occupy 8 payload blocks in the service layer frame to carry service container data. The specific process is as follows:

1) The service layer frame contains 10 payload blocks, the length of each payload block is 256 bytes, the first byte of which is used as TPN, as shown in FIG. 8. When TPN is all zeros, it means that the payload block carries the stuff data, and when the TPN is non-zero, it means that the payload block carries the service container data (the figure exemplarily shows that when the TPN is 1, it means that the payload block carries service container data).

2) The service container data needs to occupy 8 payload blocks, and the locations of the 8 payload blocks occupied by the service container data in the service layer frame are calculated preliminarily according to the sigma-delta algorithm. That is, the value of j that satisfies the inequality is solved: (j*8) mod 10<8, where j is an integer between 1 and 10 (including 1 and 10); where (j*8) mod 10 represents the remainder of the product of j and 8 divided by 10.

It can be known by calculation that the condition is satisfied when j=2, 3, 4, 5, 7, 8, 9, 10, that is, the expected location of the service container data in the service layer frame is 2, 3, 4, 5, 7, 8, 9, 10. Referring to FIG. 9, the type of data expected to be carried by the payload blocks at the $2^{nd}$, $3^{rd}$, $4^{th}$, $5^{th}$, $7^{th}$, $8^{th}$, $9^{th}$, and $10^{th}$ locations is the service container data, and the type of data expected to be carried by the payload blocks at the $1^{st}$ and $6^{th}$ locations is the stuff data.

3) A cache area is allocated for the service container, the cache area has a size of 600 bytes, and the configured preset threshold is 512 bytes.

4) In the $1^{st}$ payload block in the service layer frame, according to the sigma-delta algorithm, the type of data expected to be carried here is the stuff data; assuming that the service container data in the cache area does not exceed the preset threshold, it is determined that the type of data actually carried by this payload block is the stuff data, and the stuff data is carried in the 255 bytes in the $1^{st}$ payload block in the service layer frame, and the TPN number is set to 0 at the same time.

In the $2^{nd}$ payload block in the service layer frame, according to the sigma-delta algorithm, the type of data expected to be carried here is the service container data; assuming that the service container data in the cache area exceeds the size of one payload block, it is determined that the type of data actually carried by this payload block is the service container data, and the service container data in the cache area is carried in the 255 bytes in the $2^{nd}$ payload block in the service layer frame, and the TPN number is set to 1 at the same time.

In the $3^{rd}$ payload block in the service layer frame, according to the sigma-delta algorithm, the type of data expected to be carried here is the service container data; assuming that the service container data in the cache area exceeds the size of one payload block, it is determined that the type of data actually carried by this payload block is the service container data, and the service container data in the cache area is carried in the 255 bytes in the $3^{rd}$ payload block in the service layer frame, and the TPN number is set to 1 at the same time.

In the $4^{th}$ payload block in the service layer frame, according to the sigma-delta algorithm, the type of data expected to be carried here is the service container data; assuming that the service container data in the cache area exceeds the size of one payload block, it is determined that the type of data actually carried by this payload block is the service container data, and the service container data in the cache area is carried in the 255 bytes in the $4^{th}$ payload block in the service layer frame, and the TPN number is set to 1 at the same time.

In the $5^{th}$ payload block in the service layer frame, according to the sigma-delta algorithm, the type of data expected to be carried here is the service container data; assuming that the service container data in the cache area exceeds the size of one payload block, it is determined that the type of data actually carried by this payload block is the service container data, and the service container data in the cache area is carried in the 255 bytes in the $5^{th}$ payload block in the service layer frame, and the TPN number is set to 1 at the same time.

In the $6^{th}$ payload block in the service layer frame, according to the sigma-delta algorithm, the type of data expected to be carried here is the stuff data; assuming that the service container data in the cache area exceeds the preset threshold, it is determined that the type of data actually carried by this payload block is the service container data, and the service container data in the cache area is carried in the 255 bytes in the $6^{th}$ payload block in the service layer frame, and the TPN number is set to 1 at the same time.

In the $7^{th}$ payload block in the service layer frame, according to the sigma-delta algorithm, the type of data expected to be carried here is the service container data; assuming that the service container data in the cache area exceeds the size of one payload block, it is determined that the type of data actually carried by this payload block is the service container data, and the service container data in the cache area is carried in the 255 bytes in the $7^{th}$ payload block in the service layer frame, and the TPN number is set to 1 at the same time.

In the $8^{th}$ payload block in the service layer frame, according to the sigma-delta algorithm, the type of data expected to be carried here is the service container data; assuming that the service container data in the cache area does not exceed the size of one payload block, it is determined that the type of data actually carried by this payload block is the stuff data, and the stuff data is carried in the 255 bytes in the $8^{th}$ payload block in the service layer frame, and the TPN number is set to 0 at the same time.

In the $9^{th}$ payload block in the service layer frame, according to the sigma-delta algorithm, the type of data expected to be carried here is the service container data; assuming that the service container data in the cache area exceeds the size of one payload block, it is determined that the type of data actually carried by this payload block is the service container data, and the service container data in the cache area is carried in the 255 bytes in the $9^{th}$ payload block in the service layer frame, and the TPN number is set to 1 at the same time.

In the $10^{th}$ payload block in the service layer frame, according to the sigma-delta algorithm, the type of data expected to be carried here is the service container data; assuming that the service container data in the cache area exceeds the size of one payload block, it is determined that the type of data actually carried by this payload block is the service container data, and the service container data in the cache area is carried in the 255 bytes in the $10^{th}$ payload block in the service layer frame, and the TPN number is set to 1 at the same time.

It can be seen from the above that, originally, the $1^{st}$ and $6^{th}$ payload blocks in the service layer frame would carry the stuff data. By flexibly adjusting according to the data flow of the service container data in the cache area, the $1^{st}$ and $8^{th}$ payload blocks carry the stuff data, while the $6^{th}$ payload block carries the service container data, as shown in FIG. 10 for details.

5) The service layer frame is borne into the OTN frame structure, and the OTN frame is sent.
6) On the receiving side, the corresponding service layer frame is acquired from the OTN frame, the service container data and the stuff data are identified according to the TPN numbers of the payload blocks in the service layer frame, and the service container data is extracted from the corresponding payload blocks. The service container is obtained, and then is demapped to obtain the client service.

Figure 11:
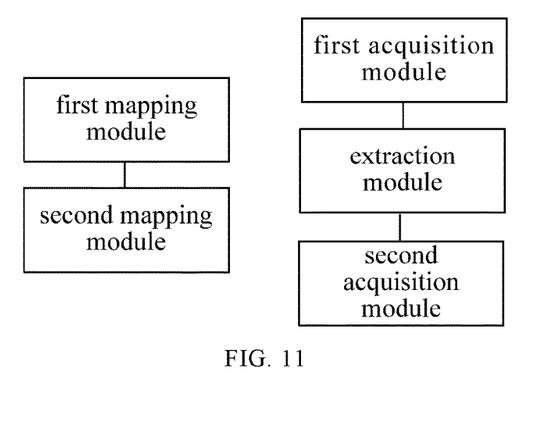
FIG. 11 is a schematic structural diagram of an apparatus for service processing in optical transport network according to the present disclosure.

FIG. 11 is a schematic structural diagram of an apparatus for service processing in optical transport network according to the present disclosure. As shown in FIG. 11, the apparatus for service processing may be used for implementing the method for service processing provided by the above embodiments. The apparatus for service processing includes a first mapping module and a second mapping module.

The first mapping module is configured to map a client service into a service container; and the second mapping module is configured to map the service container into an optical transport network frame, a payload area of the optical transport network frame includes multiple payload blocks, each of the payload blocks includes an overhead area, and the overhead area includes an indicator being used for indicating whether data carried by the payload block is service container data or stuff data.

In the present disclosure, the apparatus for service processing further includes a first acquisition module, an extraction module and a second acquisition module.

The first acquisition module is configured to acquire an optical transport network frame, and acquire data flow from the payload area of the optical transport network frame.

The extraction module is configured to determine a payload block carrying the service container data according to the indicators within the payload blocks in the data flow, and extract the service container data.

The second acquisition module is configured to acquire the client service from the service container.

For the specific description of the above modules, reference may be made to the corresponding contents in the foregoing embodiments, which will not be repeated here.

Figure 12:
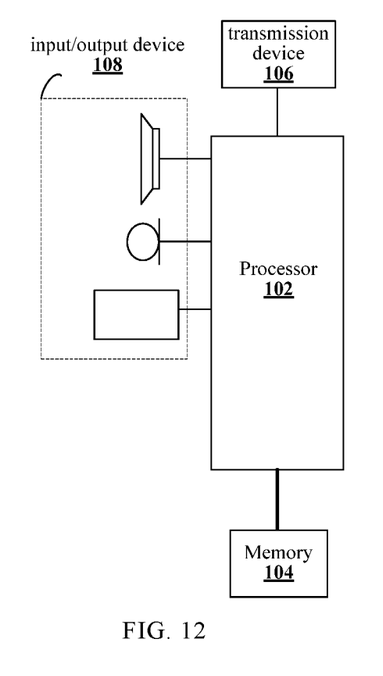
FIG. 12 is a structural block diagram of an electronic device according to the present disclosure.

FIG. 12 is a structural block diagram of an electronic device according to the present disclosure. As shown in FIG. 12, the electronic device 10 may be a mobile terminal, a computer terminal or a similar computing device. The electronic device 10 includes one or more processors 102 (only one is illustrated in the figure, the processor 102 may include, but is not limited to, a processing device such as a microprocessor MCU or a programmable logic device FPGA) and a memory 104; wherein one or more programs are stored in the memory 104. When executed by the one or more processors 102, the one or more programs cause the one or more processors 102 to implement the operations in the methods for service processing provided in the foregoing embodiments. In the present disclosure, the above mobile terminal may further include a transmission device 106 for a communication function and an input/output device 108. It will be understood by those of ordinary skill in the art that the structure shown in FIG. 12 is only for illustration, and does not limit the structure of the above mobile terminal. For example, the mobile terminal 10 may further include more or less components than those shown in FIG. 12, or have a configuration different from that shown in FIG. 12.

The memory 104 may be used to store computer programs, for example, software programs and modules of application software, such as computer programs corresponding to the method for service processing in optical transport network in the present disclosure. By running the computer program stored in the memory 104, the processor 102 executes various functional applications and data processing, that is, to implement the aforementioned method. The memory 104 may include high-speed random access memory, and may also include non-volatile memory, such as one or more magnetic storage devices, flash memories, or other non-volatile solid-state memories. In some instances, the memory 104 may further include memories located remotely from the processor 102, and these remote memories may be connected to the mobile terminal 10 through a network. The instances of such network include, but are not limited to, the Internet, an intranet, a local area network, a mobile communication network, and combinations thereof.

The transmission device 106 is used to receive or transmit data via a network. The specific instance of the aforementioned network may include a wireless network provided by the communication provider of the mobile terminal 10. In an instance, the transmission device 106 includes a Network Interface Controller (NIC), which can be connected to other network devices through the base station so as to communicate with the Internet. In an instance, the transmission device 106 may be a Radio Frequency (RF) module for communicating with the Internet wirelessly.

The present disclosure also provide a computer readable medium on which a computer program is stored, and when the program is executed by a processor, the operations in the methods for service processing provided in the foregoing embodiments are implemented.

It will be understood by those of ordinary skill in the art that all or some of the steps in the methods disclosed above, functional modules/units in the system and the apparatus can be implemented as software, firmware, hardware, and appropriate combinations thereof. In a hardware implementation, the division between functional modules/units mentioned in the above description does not necessarily correspond to the division of physical components; for example, one physical component may have multiple functions, or one function or step may be executed cooperatively by several physical components. Some or all physical components may be implemented as software executed by a processor, such as a central processing unit, digital signal processor or microprocessor, or may be implemented as hardware, or as an integrated circuit, such as an application specific integrated circuit. Such software may be distributed on computer readable media, which may include computer storage media (or non-transitory media) and communication media (or transitory media). As known to those of ordinary skill in the art, the term computer storage media includes both volatile and nonvolatile, both removable and non-removable media that are implemented in any method or technology for storing information (such as computer readable instructions, data structures, program modules or other data flexible). The computer storage medium includes, but is not limited to, RAM, ROM, EEPROM, flash memory or other memory technology, CD-ROM, Digital Video Disc (DVD) or other optical disk storage, magnetic cartridge, magnetic tape, magnetic disk storage or other magnetic storage devices, or may any other medium for storing expected information and which can be accessed by a computer. In addition, as is well known to those of ordinary skill in the art, communication media typically contain computer readable instructions, data structures, program modules, or other data in a modulated data signal such as a carrier wave or other transmission mechanism, and can include any information delivery media.

Exemplary embodiments have been disclosed herein, and although specific terms are employed, they are used for and should only be construed as a general descriptive sense and not for purposes of limitation. In some instances, it will be apparent to those skilled in the art that features, characteristics and/or elements described in connection with a particular embodiment may be used alone or used in combination with features, characteristics and/or elements described in connection with other embodiments, unless expressly stated otherwise. Accordingly, it will be understood by those of ordinary skill in the art that various changes in form and details may be made therein without departing from the scope of the present disclosure as set forth in the appended claims.

INDUSTRIAL APPLICABILITY

In the technical solutions of the present disclosure, an indicator is set in a payload block to indicate whether the data carried by the payload block is service container data or stuff data, so that in the process of mapping the service container into the optical transport network frame, rate adaptation can be performed by inserting the stuff data. The location of the payload block for carrying the service container data in the payload area can be dynamically changed according to the service container rate. Therefore, the size of the service container cache area required to be set can be decreased accordingly, which is beneficial to reduce the delay of the service mapping process.

What is claimed is:

1. A method for service processing in optical transport network, comprising:
mapping a client service into a service container; and
mapping the service container into an optical transport network frame,
wherein a payload area of the optical transport network frame consists of payload blocks, each of the payload block comprises an overhead area, and the overhead area comprises an indicator being used for indicating whether data carried by the payload block is service container data or stuff data,
wherein in the payload area of the optical transport network frame, multiple consecutive payload blocks are used as a transmission period, and
mapping the service container into the optical transport network frame comprises:

calculating the number N1 of payload blocks that need to be occupied by the service container in one transmission period according to a bandwidth of the service container and a bandwidth of the payload blocks;
determining distribution locations in the transmission period of payload blocks that need to be occupied by the service container based on a preset allocation algorithm according to the number N1 of payload blocks that need to be occupied by the service container in the transmission period; and
mapping the service container into the payload blocks at the determined distribution locations,
wherein in one transmission period, for the payload blocks for bearing the service container, in a case that data size of the service container data buffered in a service container cache area exceeds a size of one payload block, the service container data is carried in the payload block; otherwise, the stuff data is carried in the payload block.

2. The method of claim 1, wherein the bandwidth of the payload blocks allocated to the service container is larger than the bandwidth of the service container, and when mapping the service container into the payload blocks, the stuff data is inserted for rate adaptation, and the indicator is used to indicate whether the payload block carries the service container data or the stuff data.

3. The method of claim 1, wherein in M transmission periods, N1*M payload blocks for bearing the service container form a service layer frame, and the number of the payload blocks for carrying the service container data in the service layer frame is C;

$$C = \text{floor}\left(\frac{v * M * t}{L}\right)$$

wherein M is a preset integer, floor( ) is a round-down function, v represents a service container bit rate, t represents a time duration for sending data of one transmission period, and L represents a length of one payload block.

4. The method of claim 3, wherein mapping the service container into the payload blocks at the determined distribution locations comprises:
determining types of data expected to be carried respectively by N payload blocks of the service layer frame based on a preset allocation algorithm according to the number C of the payload blocks that need to be occupied by the service container data in M transmission period, wherein $N=N1^{*}M$, and the types of data comprise the service container data or the stuff data; and
determining types of data actually carried by the N payload blocks of the service layer frame according to data size of the service container data buffered in a service container cache area and the types of data expected to be carried respectively by the N payload blocks of the service layer frame.

5. The method of claim 4, wherein the preset allocation algorithm comprises sigma-delta algorithm.

6. The method of claim 4, wherein determining the types of data actually carried by the N payload blocks of the service layer frame according to the data size of the service container data buffered in the service container cache area and the types of data expected to be carried respectively by the N payload blocks of the service layer frame comprises:

for each of the N payload blocks of the service layer frame, in a case that the payload block is expected to carry the service container data, deciding whether the data size of the service container data buffered in the service container cache area exceeds a size of one payload block; and in a case that the data size of the service container data buffered in the service container cache area exceeding the size of one payload block is decided, determining that the payload block actually carries the service container data; otherwise, determining that the payload block actually carries the stuff data.

7. The method of claim 4, wherein determining the types of data actually carried by the N payload blocks of the service layer frame according to the data size of the service container data buffered in the service container cache area and the types of data expected to be carried respectively by the N payload blocks of the service layer frame comprises:

for each of the N payload blocks of the service layer frame, in a case that the payload block is expected to carry the stuff data, deciding whether the data size of the service container data buffered in the service container cache area exceeds a preset threshold; and in a case that the data size of the service container data buffered in the service container cache area exceeding the preset threshold is decided, determining that the payload block actually carries the service container data; otherwise, determining that the payload block actually carries the stuff data, wherein the preset threshold is greater than or equal to a size of one payload block.

8. The method of claim 1, wherein the indicator occupies 1 bit, the indicator of the payload block carrying the service container data is 1, and the indicator of the payload block carrying the stuff data is 0.

9. The method of claim 1, further comprising:

acquiring the optical transport network frame, and acquiring data flow from the payload area of the optical transport network frame;

determining the payload blocks carrying the service container data according to the indicators within the payload blocks in the data flow, and extracting the service container data; and acquiring the client service from the service container.

10. An electronic device, comprising:

one or more processors; and a memory storing one or more programs thereon, wherein the one or more programs, when executed by the one or more processors, cause the one or more processors to implement the method of claim 1.

11. A non-transitory computer readable medium storing a computer program thereon, wherein the computer program, when executed by a processor, cause the processor to implement the method of claim 1.

12. An apparatus for service processing in optical transport network, comprising:

a first mapping module configured to map a client service into a service container; and a second mapping module configured to map the service container into an optical transport network frame, wherein a payload area of the optical transport network frame comprises multiple payload blocks, each of the payload block comprises an overhead area, and the overhead area comprises an indicator being used for indicating whether data carried by the payload block is service container data or stuff data, wherein in the payload area of the optical transport network frame, multiple consecutive payload blocks are used as a transmission period, and the second mapping module is configured to:

calculate the number N1 of payload blocks that need to be occupied by the service container in one transmission period according to a bandwidth of the service container and a bandwidth of the payload blocks;

determine distribution locations in the transmission period of payload blocks that need to be occupied by the service container based on a preset allocation algorithm according to the number N1 of payload blocks that need to be occupied by the service container in the transmission period; and map the service container into the payload blocks at the determined distribution locations, wherein in one transmission period, for the payload blocks for bearing the service container, in a case that data size of the service container data buffered in a service container cache area exceeds a size of one payload block, the service container data is carried in the payload block; otherwise, the stuff data is carried in the payload block.

13. The apparatus of claim 12, further comprising:

a first acquisition module configured to acquire the optical transport network frame, and acquire data flow from the payload area of the optical transport network frame;

an extraction module configured to determine the payload blocks carrying the service container data according to the indicators within the payload blocks in the data flow, and extract the service container data; and a second acquisition module configured to acquire the client service from the service container.

* * * * *

UNITED STATES PATENT AND TRADEMARK OFFICE
CERTIFICATE OF CORRECTION

| | | |
|---|---|---|
| PATENT NO. | : 12,395,262 B2 | |
| APPLICATION NO. | : 17/914790 | |
| DATED | : August 19, 2025 | |
| INVENTOR(S) | : Yuanbin Zhang et al. | |

It is certified that error appears in the above-identified patent and that said Letters Patent is hereby corrected as shown below:

In the Specification

Column 14, Line 51, the formula reading - N=N1.sup.*M - should read -- N=N1*M --

Signed and Sealed this
Ninth Day of December, 2025

John A. Squires
*Director of the United States Patent and Trademark Office*